3,507,902
PROCESS FOR PREPARING ALPHA-
CHLOROACRYLONITRILES
Nancy G. Renkert, Shaker Heights, and Janice L. Greene,
Chagrin Falls, Ohio, assignors to The Standard Oil
Company, Cleveland, Ohio, a corporation of Ohio
No Drawing. Filed July 21, 1967, Ser. No. 654,951
Int. Cl. C07c 121/30
U.S. Cl. 260—465.7
8 Claims

ABSTRACT OF THE DISCLOSURE

A process is described herein for preparing alpha-chloroacrylonitrile and related compounds. The process is carried out by heating 1,2-dichloro-1,2-dicyanocyclobutane or related compounds in the presence of a neutral, acidic, or basic catalytic solids at a temperature in the range of about 100–500° C. and at atmospheric or subatmospheric pressure. Compounds produced by the herein described process can be polymerized to yield polymers possessing a variety of properties, chief among which is flame resistance.

---

This invention relates to a process for preparation of alpha-chloroacrylonitriles in essentially quantitative yields. The process is effected by thermally decomposing a particular dichlorodicyanocyclobutane in the presence of catalytic solids.

A number of processes are disclosed for preparation of alpha-chloroacrylonitrile. In one liquid-phase chlorination process for preparing alpha-chloroacrylonitrile chlorination of acrylonitrile is caused to proceed until a large quantity of the trichloro compound—alpha, alpha, beta-trichloropropionitrile—is obtained, which is then dehalogenated to produce alpha-chloroacrylonitrile. The dehalogenation is accomplished by an agent, such as Mg—MgI$_2$, which is prepared by reacting a considerable excess of magnesium metal with elemental iodine in a suitable solvent containing a reducing agent. A yield of 40 percent has been reported for such a process. The foregoing process is more fully described in U.S. Patent No. 2,384,889.

In another process, disclosed in U.S. Patent No. 2,231,363, vapor-phase chlorination of acrylonitrile is accomplished by passing chlorine and acrylonitrile over a catalyst, such as activated carbon, at a temperature in the preferred range of 230–450° C. The temperature is sufficiently high to cause substitution of chlorine on the carbon atom but not so high as to cause decomposition and carbonization. The gases are cooled to condense the liquid product. The condensate is then distilled to separate the low boiling fraction boiling below 100° C. from the high boiling fraction boiling in the range of 100–178° C. The high boiling fraction consisted of beta-chloropropionitrile and alpha, alpha, beta-trichloropropionitrile. The low boiling fraction, consisting of unreacted acrylonitrile and alpha-chloroacrylonitrile, is fractionated under reduced pressure in the presence of a polymerization inhibitor to separate alpha-chloroacrylonitrile from acrylonitrile. A yield of 40 percent alpha-chloroacrylonitrile is reported, but beta-chloropropionitrile and alpha, alpha, beta-trichloropropionitrile are also produced.

The disadvantages of the known processes resides in the fact that they produce mixtures of chlorinated nitriles which must be separated to yield either alpha-chloroacrylonitrile or the trichloropropionitrile which in turn must be dehalogenated to give alpha-chloroacrylonitrile.

The novel process disclosed herein relates to preparation of alpha-chloroacrylonitrile and related compounds in essentially quantitative yields without formation of any of the other chlorinated by-products. The preparation of alpha-chloroacrylonitrile is accomplished by thermal decomposition of 1,2-dichloro-1,2-dicyanocyclobutane at elevated temperatures and at atmospheric or reduced pressure.

More generally, the instant process relates to thermal decomposition of a compound having the structural formula

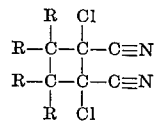

wherein R is hydrogen or a hydrocarbon radical, preferably alkyl, having one to six carbon atoms and wherein the R's are same or different. Thermal decomposition of above compound yields a compound which falls into the class of compounds as represented by the following formula:

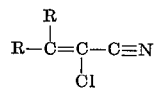

wherein R is as defined above.

It has been discovered that alpha-chloroacrylonitrile is readily obtained in essentially quantitative yields on the order of 40 percent conversion by passing 1,2-dichloro-1,2-dicyanocyclobutane over a neutral, acidic, or basic catalytic solids at a temperature in the range of about 100–500° C. and at a pressure ranging from 0.01–1 atmosphere. Contact times may vary between 0.1 and 100 seconds. The reaction can be effectively carried out with the aid of carrier gases such as, for example, air or nitrogen.

The catalytic solids which can be employed include the neutral support Filtros, a commercially available solid consisting of porous silica; weakly basic Versamid on Filtros; strongly basic material consisting of extruded ZnO·MgO; and H$_3$PO$_4$ on Filtros. Versamid is a commercially available polyamide resin of approximately 5000 molecular weight.

EXPERIMENTAL PROCEDURE

The experimental apparatus used in carrying out the investigation of this reaction consisted of a vertically mounted glass tube packed with a catalytic solid and heated externally by means of a heating tape. The glass tube having a void volume of 16 ml. was packed with catalytic solids and wrapped with asbestos to provide isothermal conditions. The internal temperatures was assumed to be that obtained from a thermocouple mounted between the tube and the heating tape. The reactants were introduced into the top of the glass reactor by means of either a motor-driven syringe or a dropping funnel. The carrier gas, nitrogen or air, was admitted through a port in the top of the tube. The products were collected in an ice trap followed by a succession of Dry Ice traps. When operating under reduced pressure, the vacuum gauge was placed between the ice trap and the first Dry Ice trap by means of a T joint. The motor-driven syringe could not be used under reduced pressures and the reactants had to be added manually through a dropping funnel. For this reason, the contact times given in the data table are only approximate.

The data obtained from this study is summarized in the table below. The identity of the product was determined by means of the infrared spectrum.

TABLE I

| Catalyst | Carrier gas | Temperature (°C.) | Pressure (atmosphere) | Contact time (seconds) | Percent recovered of 1,2-dichloro-1,2-dicyano-cyclobutane | Percent conversion to alpha-chloro-acrylonitrile |
|---|---|---|---|---|---|---|
| Filtros | N₂ | 300 | 1 | 12 | 80 | 20 |
| Do | N₂ | 300 | 1 | 36 | 85 | 13 |
| Versamid on Filtros | N₂ | 300 | 1 | 3 | 85 | 13 |
| Do | N₂ | 300 | 1 | 14 | 75 | 22 |
| Do | N₂ | 300 | 1 | 36 | 60 | 40 |
| H₃PO₄ | N₂ | 300 | 1 | 43 | 80 | 20 |
| Filtros | N₂ | 400 | 0.01 | 1 | 85 | 8 |
| Do | Air | 400 | 0.01 | 0.4 | 75 | 16 |
| H₃PO₄ on Filtros | N₂ | 400 | 0.01 | 1.2 | 60 | 12 |
| 3ZnO.MgO | N₂ | 400 | 0.01 | 1 | 65 | 18 |
| 3ZnO.MgO | N₂ | 400 | 0.01 | 50 | 50 | 36 |
| 3ZnO.MgO | Air | 400 | 0.01 | 0.3 | 60 | 23 |

Results of the experiments indicate that the process is operable within the limits investigated. Varying the type of catalytic solids over a wide range had little effect on the reaction, although there is some indication that somewhat higher conversions can be obtained with the basic catalytic solids. Also, the effect of the use of air or nitrogen, reactor pressure, contact time, and temperature appears to have little effect on the conversion. A maximum conversion of 40 percent to alpha-chloroacrylonitrile was obtained with the catalytic solids, Versamid on Filtros, using a nitrogen atmosphere, at a pressure of 1 atmosphere at 300° C. and a contact time of 36 seconds.

It can be seen from the material balance derived from the percent of the 1,2-dichloro-1,2-dicyanocyclobutane converted to alpha-chloroacrylonitrile and the percent of the starting material recovered, that little if any of the feed is converted to other chlorinated by-products.

We claim:
1. A process for preparing an alpha-chloroacrylonitrile having the formula

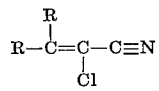

comprising the steps of thermal decomposing a compound having the formula

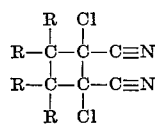

wherein R is hydrogen or an alkyl radical of one to six carbon atoms and wherein the R's are the same or different, by contacting said compound with a catalyst selected from the group consisting of a polyamide, silica, zinc oxide-magnesium oxide, and phosphoric acid, at a temperature in the range of about 100–500° C., for a period of about 0.1 to 100 seconds, at a pressure ranging up to about one atmosphere and in the presence of an inert carrier gas and recovering the alpha-chloroacrylonitrile product.

2. The process of claim 1 wherein the catalyst is a polyamide.
3. The process of claim 1 wherein the catalyst is zinc oxide-magnesium oxide.
4. The process of claim 1 wherein the catalyst is phosphoric acid.
5. The process of preparing alpha-chloroacrylonitrile consisting essentially of contacting 1,2-dichloro-1,2-dicyanocyclobutane with a catalyst selected from the group consisting of a polyamide, silica, zinc oxide-magnesium oxide, and phosphoric acid, at a temperature in the range of about 100–500° C., for a period of about 0.1 to 100 seconds, at a pressure ranging up to about one atmosphere and in the presence of an inert carrier gas and recovering the alpha-chloroacrylonitrile.
6. The process of claim 5 wherein the catalyst is a polyamide.
7. The process of claim 5 wherein the catalyst is zinc oxide-magnesium oxide.
8. The process of claim 5 wherein the catalyst is phosphoric acid.

References Cited

UNITED STATES PATENTS

| 2,754,323 | 7/1956 | Anderson | 260—465.7 XR |
| 2,773,089 | 12/1956 | Anderson | 260—465.9 XR |
| 2,782,218 | 2/1957 | Drysdale | 260—465.7 |
| 3,092,654 | 6/1963 | Schreyer | 260—464 XR |
| 3,347,902 | 10/1967 | Grasselli et al. | 260—465.9 |
| 3,362,983 | 1/1968 | Sennewald el al. | 260—465.7 |

JOSEPH P. BRUST, Primary Examiner

U.S. Cl. X.R.

260—464

PO-1050
(5/69)

UNITED STATES PATENT OFFICE
CERTIFICATE OF CORRECTION

Patent No. 3,507,902                    Dated April 21, 1970

Inventor(s) Nancy G. Renkert et al

It is certified that error appears in the above-identified patent and that said Letters Patent are hereby corrected as shown below:

Column 1: Line 65, "resides" should be --reside--;

Column 2: Line 57, "temperatures" should be --temperature--;

Column 3: Line 14, Table I, Column 1, after "$H_3PO_4$" insert --on Filtros--;

Column 3: Line 19, Table I, Column 5, "50" should be --0.5--.

Signed and sealed this 28th day of September 1971.

(SEAL)
Attest:

EDWARD M. FLETCHER, JR.
Attesting Officer

ROBERT GOTTSCHALK
Acting Commissioner of Patents